United States Patent Office 3,577,457
Patented May 4, 1971

3,577,457
PROCESS FOR PREPARING 4,4'-DICARBOXY-
BENZOPHENONE
Johann G. D. Schulz, Pittsburgh, Pa., assignor to Gulf
Research and Development Company, Pittsburgh, Pa.
No Drawing. Filed July 19, 1968, Ser. No. 745,962
Int. Cl. C07c 65/20
U.S. Cl. 260—517                                    13 Claims

ABSTRACT OF THE DISCLOSURE

A process for preparing purified 4,4'-dicarboxybenzophenone which invloves treating a mixture containing 4,4'-dicarboxybenzophenone and impurities with methanol or ethylene glycol at a temperature below about 85° C., whereby the 4,4'-dicarboxybenzophenone remains unaffected but the impurities are removed.

---

This invention relates to a process for purifying 4,4'-dicarboxybenzophenone, particularly a product containing 4,4'-dicarboxybenzophenone obtained as a result òf the nitric acid oxidation of a 4,4'-dialkyl 1,1-diphenylalkane, such as 4,4'-dialkyl-1,1-diphenylethane.

In U.S. Pat. No. 3,197,499 of McCracken et al., dated July 27, 1965, a mixture, such as identified above, was treated with methanol under esterification conditions such that the 4,4'-dicarboxybenzophenone was esterified and the contaminants associated therewith were solubilized in the excess methanol required to be used. Since the 4,4'-dicarboxybenzophenone ester was insoluble in the excess methanol and the impurities were soluble, simple filtration was sufficient to obtain a purified 4,4' - dicarboxybenzophenone ester. In addition to excess methanol, a temperature of at least about 65° C., preferably about 110° to about 160° C. and a reaction period of at least about 0.5 hour, preferably from about one to about five hours, was required and adjustment of temperature and time was made that would in all cases result in the production of the 4,4'-dicarboxybenzophenone ester and the solubilization of the impurities. In order to obtain the purified 4,4'-dicarboxybenzophenone, the corresponding ester so produced was subjected to hydrolysis conditions.

I have found, unexpectedly, that a mixture such as defined above can be purified and that purified 4,4'-dicarboxybenzophenone can be recovered by a procedure wherein the mixture is treated with methanol or ethylene glycol at a temperature below about 85° C., preferably within a range of about 50° to about 80° C., but preferably at a temperature of about 65° C. for methanol and about 70° C. for ethylene glycol. Contrary to the teaching of the McCracken et al. patent, at the reduced temperature levels defined herein the 4,4'-dicarboxybenzophenone is not esterified but is insoluble in the methanol or ethylene glycol. The slurry so produced can be treated in any convenient manner, for example, by filtration, to separate the 4,4'-dicarboxybenzophenone from the methanol and ethylene glycol. Upon such separation, purified 4,4'-dicarboxybenzophenone is obtained, for the impurities, apparently soluble in the methanol and ethylene glycol, are removed therewith.

The 4,4'-dicarboxybenzophenone purified herein is that obtained as a result of the nitric acid oxidation of a di-alkyldiphenylalkane having the following structural formula:

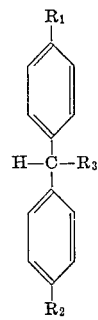

wherein $R_1$, $R_2$ and $R_3$, the same or different, are selected from the group of alkyl substituents having from one to five carbon atoms, preferably from one to three carbon atoms, such as methyl, ethyl, propyl, isopropyl, butyl, isobutyl, amyl, isoamyl, etc. In a preferred embodiment each of $R_1$, $R_2$ and $R_3$ is methyl. Specific examples of dialkyldiphenylalkanes that can be used include 1,1 bis 4-methylphenylethane, 1,1 bis 4-ethylphenylethane, 1,1 bis 4-propylphenylethane, 1,1 bis 4-isopropylphenylethane, 1,1 bis 4-butylphenylethane, 1,1 bis 4-isoamylphenylethane, 1,1 bis 4 - methylphenylpropane, 1,1 bis 4-isopropylphenylpentane, 1,4 - ethylphenyl, 1,4-butylphenylpropane, 1,4-methylphenyl, 1,4-isopropylphenylethane, etc. Of these I prefer to employ 1,1 bis 4-methylphenylethane.

Preferably the process used in converting the dialkyldiphenylalkane to 4,4'-dicarboxybenzophenone is the process defined in U.S. Pat. No. 3,075,007 of McCracken et al. wherein the dialkyldiphenylalkane is oxidized with nitric acid having a concentration of about five to about seventy percent at a temperature of about 110° to about 350° C. and a pressure of about atmospheric to about 500 pounds per square inch gauge for about one minute to about 48 hours. Regardless of the specific dialkyldiphenylalkane used at the end of the reaction period a solid amorphous 4,4'-dicarboxybenzophenone is obtained, which precipitates out of the reaction mixture and can be recovered therefrom by simple filtration. The 4,4'-dicarboxybenzophenone so produced, however, instead of being substantially pure is admixed with contaminants, which in most cases render the normally, and desirably white, 4,4'-dicarboxybenzophenone yellow to tan.

The first step in the process involves mixing the impure 4,4'-dicarboxybenzophenone so obtained with methanol or ethylene glycol. Although any amount of methanol or ethylene glycol can be used, the amount necessary is small and need only be present in amounts necessary to remove the contaminants, which in most cases amount to about ten to about thirty percent by weight of the 4,4'-dicarboxybenzophenone, and sufficient to obtain good mixing with the 4,4'-dicarboxybenzophenone. Thus, at least about one part by weight, preferably about two to about four parts by weight of methanol or ethylene glycol per weight of impure 4,4'-dicarboxybenzophenone being treated is sufficient. As in U.S. Pat. No. 3,197,499 I have present a small amount of an esterification catalyst, for example about one to about twenty percent by weight, based on the 4,4'-dicarboxybenzophenone, of sulfuric acid, hydrofluoric acid, hydrochloric acid, phosphoric acid, toluene sulfonic acid, boron trifluoride, etc. Although I do not wish to be so bound, I believe the impurities are not solubilized, in the clasic sense, but are esterified and it is the ester so resulting that is rendered soluble in the methanol or ethylene glycol. Surprisingly, despite the expectation and requirement of U.S. Pat. No. 3,197,499, I obtain substantially no esterification of the 4,4'-dicarboxybenzophenone.

As pointed out above, the reaction temperatures are critical. Pressures do not affect the course of the present purification procedure and while about atmospheric pressure is therefore preferable pressures, for example up to about 1000 pounds per square inch gauge, can be employed. Treatment time is critical, for example, from about 0.5 to about 24 hours, preferably from about three to about seven hours, that is, sufficient time to obtain disappearance of the impurities in the methanol or ethylene glycol but not sufficient to obtain undesired esterification of the 4,4'-dicarboxybenzophenone.

The mixture at the beginning and at the end of the treatment is in the form of a slurry and any convenient procedure, for example, filtration can be used to separate the purified 4,4'-dicarboxybenzophenone from the methanol or ethylene glycol containing the impurities originally in admixture with the 4,4'-dicarboxybenzophenone. No further treatment is required to obtain purified 4,4'-dicarboxybenzophenone in accordance with the procedure of this invention.

The process of this invention can further be illustrated by the following.

EXAMPLE I

Into a two-liter stainless steel autoclave there was placed 300 milliliters of water and 105 grams of an isomeric mixture of ditolylethane (78.5 percent by weight being the 4,4'-isomer, 18.5 percent by weight being the 2,4'-isomer, 2.4 percent by weight being the 3,4'-isomer and 0.6 percent by weight being the 2,2'-isomer). The mixture was heated to 120° C. and over a one-hour period there was pumped into the mixture 415 grams of a seventy percent aqueous nitric acid. The temperature was raised to 170° C. and the mixture, with stirring, was maintained at this temperature for three hours. At the beginning of the run the pressure was about atmospheric but by the end of the reaction the pressure had risen to about 800 pounds per square inch gauge and no gaseous products were permitted to escape. The reaction mixture was cooled to room temperature, vented to the atmosphere and then filtered to recover 122 grams of off-white, solid 4,4'-dicarboxybenzophenone. A portion of the latter product (116 grams), 500 milliliters of methanol and one milliliter of concentrated sulfuric acid were refluxed at atmospheric pressure and a temperature of 65° C. for seven hours. After cooling the product was filtered, washed with methanol and dried. Analysis of the solid product, which was white, showed it to be only 4,4'-dicarboxybenzophenone with substantially no loss over that present in the charge. Only traces of 4,4'-dicarboxybenzophenone was found in the filtrate. The results obtained are tabulated below in Table I.

TABLE I

| | Product composition, grams | |
|---|---|---|
| | Before purification | After purification |
| 4,4'-dicarboxybenzophenone | 85.4 | 85.0 |
| 2,4'-dicarboxybenzophenone | 18.0 | None |
| Terephthalic acid | 7.4 | None |
| Monoacids | 5.2 | None |

EXAMPLE II

That methanol is unique in the present process and that higher alkanols will not function herein is apparent from the following. A mixture of ditolylethanes was subjected to oxidation with nitric acid as in Example I except that the gaseous products formed during the reaction were permitted to escape as they were formed and the pressure was not permitted to rise above 200 pounds per square inch gauge. A portion (116 grams) of the impure 4,4'-dicarboxybenzophenone so produced was subjected to purification as in Example I with 500 milliliters of ethanol at 78° C. for twenty hours. The results obtained are shown below in Table II.

TABLE II

| | Product composition, grams | |
|---|---|---|
| | Before purification | After purification |
| 4,4'-dicarboxybenzophenone | 79.5 | 56.1 |
| 2,4'-dicarboxybenzophenone | 14.5 | None |
| Terephthalic acid | 9.5 | 3.1 |
| Monoacids | 12.5 | 8.9 |

From the above it can be seen that whereas 2,4'-dicarboxybenzophenone was completely separated as an impurity using ethanol a substantial amount of terephthalic acid and aromatic monoacids were still present. This procedure is also disadvantageous in that almost thirty percent of the 4,4'-dicarboxybenzophenone was lost.

EXAMPLE III

That it is imperative to maintain the temperature below about 85° C. during the purification is apparent from the following. 100 grams (68.7 grams of 4,4'-dicarboxybenzophenone, 12.7 grams of 2,4'-dicarboxybenzophenone, 4.8 grams of terephthalic acid and 13.8 grams of mono- and diaromatic acids) of an impure mixture of 4,4'-dicarboxybenzophenone obtained from the nitric acid oxidation of an isomeric mixture of ditolylethanes, 500 milliliters of methanol and two milliliters of concentrated sulfuric acid were heated in a closed container and at autogeneous pressure for twelve hours at 90° C. At the end of this time, the reaction mixture was cooled to room temperature, filtered and the solid product was analyzed and found to consist of the dimethyl ester of 4,4'-dicarboxybenzophenone.

EXAMPLE IV

The necessity of having an esterification catalyst present is seen from the following example. 116.6 grams of an impure mixture of 4,4'-dicarboxybenzophenone obtained from the nitric acid oxidation of an isomeric mixture of ditolylethanes was refluxed with 500 grams of methanol at 64.7° C. for sixteen hours. The reaction mixture was cooled to room temperature, filtered and both the solids and filtrate were analyzed. The results obtained are shown below in Table III. It can be seen that even prolonged reaction periods are not effective for entire removal of terephthalic acid and monoacids in the absence of an esterification catalyst.

TABLE III

| | Product composition before purification, grams | Solid product composition after purification, grams | Filtrate composition, grams |
|---|---|---|---|
| 4,4'-dicarboxybenzophenone | 86.0 | 83.3 | 3.0 |
| 2,4'-dicarboxybenzophenone | 18.1 | None | 18.0 |
| Terephthalic acid | 7.4 | 4.1 | 3.2 |
| Monoacids | 5.1 | 3.0 | 2.0 |

EXAMPLE V

The utility of ethylene glycol in the process can be seen from a consideration of the following run. Fifty grams of an impure mixture of 4,4'-dicarboxybenzophenone (containing 41.2 grams of 4,4'-dicarboxybenzophenone, five grams of 2,4'-dicarboxybenzophenone, five grams of terephthalic acid and 1.4 grams of mono-and diaromatic acids) obtained from the nitric acid oxidation of an isomeric mixture of ditolylethanes was refluxed at 65° C. with 200 grams of ethylene glycol and one milliliter of concentrated sulfuric acid at atmospheric pressure for twelve hours. The reaction product was cooled to atmospheric temperature, filtered and washed with acetone. There was recovered 39 grams of pure 4,4'-dicarboxybenzophenone.

Obviously, many modifications and variations of the invention, as hereinabove set forth, can be made without departing from the spirit and scope thereof, and therefore only such limitations should be imposed as are indicated in the appended claims.

I claim:

1. In a process wherein a dialkyldiphenylethane is oxidized with nitric acid to obtain 4,4'-dicarboxybenzophenone admixed with impurities, the improvement which comprises heating a slurry of said impure 4,4'-dicarboxybenzophenone, a compound selected from the group consisting of methanol and ethylene glycol and an esterification catalyst at a temperature below about 85° C. for about 0.5 to about 24 hours and thereafter separating from said slurry purified 4,4'-dicarboxybenzophenone.

2. The process of claim 1 wherein said compound is methanol.

3. The process of claim 1 wherein said compound is ethylene glycol.

4. The process of claim 1 wherein said oxidation with nitric acid is effected with nitric acid having a concentration of about five to about seventy percent at a temperature of about 110° to about 350° C. and a pressure of about atmospheric to about 500 pounds per square inch gauge for about one minute to about 48 hours.

5. The process of claim 1 wherein said dialkyldiphenylethane is 4,4'-ditolylethane.

6. The process of claim 1 wherein said compound is methanol and the temperature is about 50° to about 80° C.

7. The process of claim 1 wherein said compound is methanol and the temperature is about 65° C.

8. The process of claim 1 wherein said compound is ethylene glycol and the temperature is about 50° to about 80° C.

9. The process of claim 1 wherein said compound is ethylene glycol and the temperature is about 70° C.

10. The process of claim 1 wherein the amount of said compound is at least about one part by weight per weight of impure 4,4'-dicarboxybenzophenone.

11. The process of claim 1 wherein said esterification catalyst is sulfuric acid.

12. The process of claim 1 wherein said oxidation with nitric acid is effected with nitric acid having a concentration of about five to about seventy percent at a temperature of about 110° to about 350° C. and a pressure of about atmospheric to about 500 pounds per square inch gauge for about one minute to about 48 hours, said compound is methanol, said esterification catalyst is sulfuric acid, the purification temperature is about 50° to about 80° C. and the amount of methanol is at least about one part by weight per weight of impure 4,4'-dicarboxybenzophenone.

13. The process of claim 1 wherein said oxidation with nitric acid is effected with nitric acid having a concentration of about five to about seventy percent at a temperature of about 110° to about 350° C. and a pressure of about atmospheric to about 500 pounds per square inch gauge for about one minute to about 48 hours, said compound is ethylene glycol, said esterification catalyst is sulfuric acid, the purification temperature is about 50° to about 80° C. and the amount of ethylene glycol is at least about one part by weight per weight of impure 4,4'-dicarboxybenzophenone.

References Cited

UNITED STATES PATENTS 3,197,499   7/1965   McCracken et al. ____ 260—517

JAMES A. PATTEN, Primary Examiner